Figure 1:
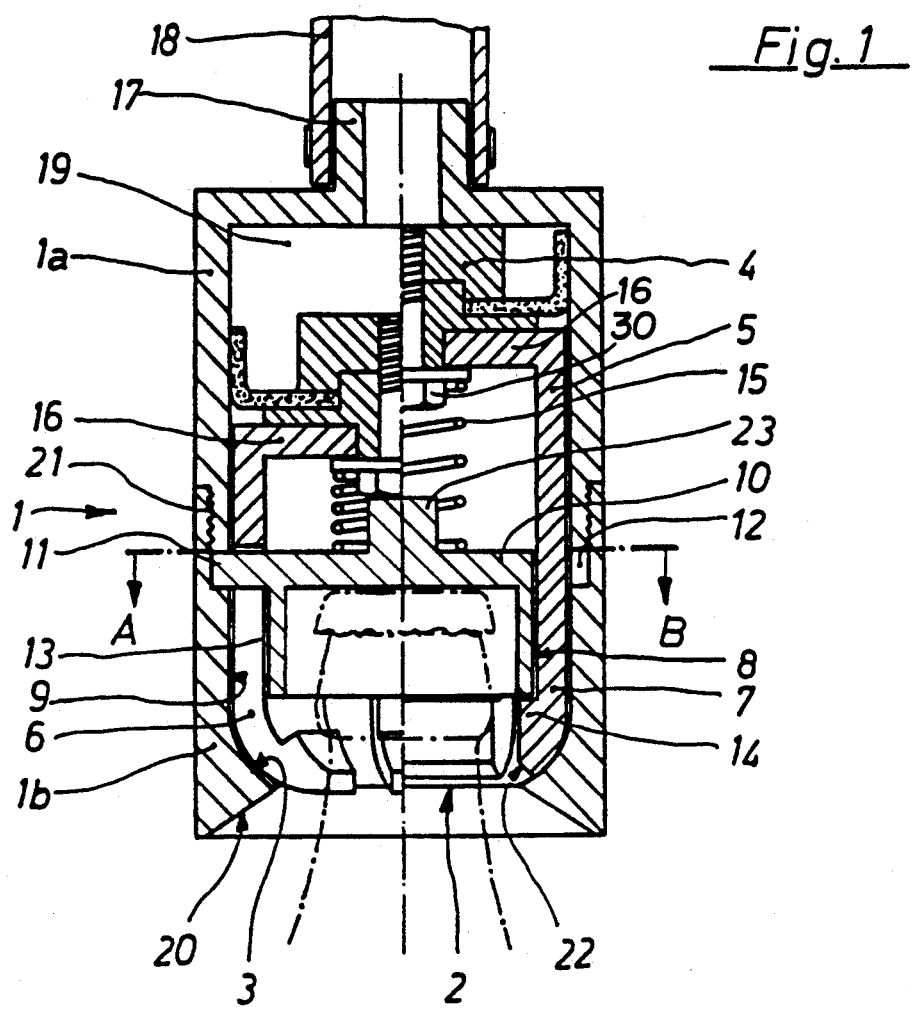

United States Patent [19]

Kronseder

[11] Patent Number: 5,295,723
[45] Date of Patent: Mar. 22, 1994

[54] GRIPPING BELL FOR BOTTLES OR THE LIKE

[76] Inventor: Hermann Kronseder, Regensburger Strasse 42, 8404 Woerth, Fed. Rep. of Germany

[21] Appl. No.: 915,836
[22] PCT Filed: Jan. 22, 1991
[86] PCT No.: PCT/EP91/00117
§ 371 Date: Jul. 24, 1992
§ 102(e) Date: Jul. 24, 1992
[87] PCT Pub. No.: WO91/11378
PCT Pub. Date: Aug. 8, 1991

[30] Foreign Application Priority Data

Jan. 26, 1990 [DE] Fed. Rep. of Germany ... 9000849[U]
Mar. 7, 1990 [DE] Fed. Rep. of Germany ... 9002618[U]

[51] Int. Cl.⁵ .............................................. B66C 1/48
[52] U.S. Cl. ...................................... 294/88; 294/100
[58] Field of Search ................... 294/88, 90, 99.1, 100, 294/115, 116

[56] References Cited

U.S. PATENT DOCUMENTS

| | | | |
|---|---|---|---|
| 1,526,412 | 2/1925 | Brown | 294/100 X |
| 2,899,232 | 8/1959 | Walter, Jr. | 294/116 X |
| 3,554,594 | 1/1971 | Thoma | 294/88 |
| 3,970,201 | 7/1976 | Kenne | 294/116 X |
| 4,093,296 | 6/1978 | Itoh | 294/116 X |
| 4,130,314 | 12/1978 | Storm | 294/100 |

FOREIGN PATENT DOCUMENTS

| | | |
|---|---|---|
| 1586012 | 4/1970 | Fed. Rep. of Germany . |
| 22346430 | 1/1975 | Fed. Rep. of Germany . |
| 13819598 | 9/1989 | Fed. Rep. of Germany . |

Primary Examiner—David M. Mitchell
Assistant Examiner—Dean J. Kramer
Attorney, Agent, or Firm—Finnegan, Henderson, Farabow, Garrett & Dunner

[57] ABSTRACT

A gripping bell for bottles or the like, comprising a sleevelike housing which has on one side thereof a reception opening for a bottle, the reception opening being followed by a control surface which conically widens towards the inside, further comprising an axially movable actuating element arranged in the housing on the other side thereof, and a collet chuck acted upon by the actuating element and guided in the housing such that it is axially movable therein. The collet chuck has elastic gripping fingers which are separated from one another by slots and adapted to be moved in the radial direction by means of the control surface in response to axial relative movement between the collet chuck and the housing, whereby the gripping fingers will take hold of a bottle from outside or release it. A stationary guide surface (8) for the collet chuck (5, 5a) and its gripping fingers (7), is provided in the interior of the bell.

24 Claims, 2 Drawing Sheets

GRIPPING BELL FOR BOTTLES OR THE LIKE

The present invention relates to a gripping bell for bottles or the like, comprising a sleevelike housing which has on one side thereof a reception opening for a bottle or the like, said reception opening being followed by a control surface which conically widens towards the inside, further comprising an axially movable actuating element arranged in said housing on the other side thereof, and a collet chuck acted upon by said actuating element and guided in said housing such that it is axially movable therein, the elastic gripping fingers of said collet chuck, which are separated from one another by slots, being adapted to be moved in the radial direction by means of said control surface in response to an axial relative movement between the collet chuck and the housing, whereby said gripping fingers will take hold of the bottles or the like from outside or release said bottles or the like.

A gripping bell is already known in the case of which the gripping fingers of the collet chuck, which is formed integrally with the pistonlike actuating element, rest with their free ends exclusively on the conical control surface in the open condition as well as in the closed condition of the collet chuck (German-Offenlegungsschrift 1 586 012). Additional guide means for the gripping fingers are not provided. This known gripping bell can be used for a great variety of bottles and vessels and requires only little actuating forces. It is, however, disadvantageous insofar as uncontrolled deformation of the gripping fingers will occur and insofar as said gripping fingers are subject to strong bending loads, especially at the point of transition to the actuating element In view of the fact that the collet chuck must, moreover, consist of a comparatively rigid material, the gripping fingers will frequently break off even after an only short period of use. For the purpose of sealing the actuating element with respect to the inner surface of the housing acting as a cylinder, a separate sealing ring is provided, which is arranged in an annular groove of the actuating element.

Furthermore, a different, prior art gripping bell is already known, in the case of which a clamping sleeve is arranged in a sleevelike housing, one end of said clamping sleeve resting on a collar of the housing in the area of the reception opening, whereas the other end thereof rests on an actuating piston, which is guided in said housing such that it is axially displaceable therein (German-Offenlegungsschrift 38 19 598). The sleeve is curved slighty inwards and provided with openings so that its internal diameter will decrease in the case of an axial compression caused by the actuating piston. This known gripping bell can only be used for specific shapes of bottles and vessels and requires comparatively high actuating forces. In view of the fact that the clamping sleeve must also produce the restoring force, it must consist of a comparatively rigid material. Hence, its service life is limited. When the gripping bell becomes slack, it may happen that the bottles get caught in the gripping bell in an uncontrolled manner.

The present invention is based on the task of considerably increasing, with the aid of simple means, the service life of the collet chuck in the case of a gripping bell according to the generic clause, said type of gripping bell being mentioned at the beginning.

In accordance with the present invention, this task is solved by the feature that a stationary guide surface for the collet chuck and its gripping fingers, respectively, is arranged in the interior of the collet chuck.

Due to the fact that the collet chuck and its gripping fingers, respectively, are guided exactly not only on the outer side thereof but also on the inner side thereof by the guide surface, which is stationary together with the housing and which will slide on the collet chuck, if necessary, a defined deformation can be achieved in the course of the movement between the opened and the closed position, without any uncontrolled bending or buckling of the gripping fingers being caused. Moreover, in view of the precise mode of guiding, an essentially less rigid material can be used.

All this will result in an essential extension of the service life of a gripping bell according to the present invention.

There are several possible designs for constructing the inner guide surface as well as the outer guide surface for the collet chuck and its grippping fingers, said outer guide surface being formed on the housing. By means of these structural designs, precise guiding on all sides is achieved so that, when the collet chuck moves to the closing position, only the end sections of the gripping fingers will be bent by the control surface. The remaining part of the collet chuck, which is received between the inner and outer guide surfaces, can maintain its cylindrical shape and has only the function of transmitting the movement to the ends of the gripping fingers in the manner of a sliding sleeve. In this connection, it will be expedient to round the control surface in a concave shape, whereby it will be possible to effect a movement of the gripping finger ends in an almost exclusively radial direction, in particular when these gripping finger ends are rounded in a complementary convex shape.

There are also disclosed various embodiments of holding the inner guide surface for the collet chuck. Particularly rigid fixing of the guide surface as well as a compact, economy-priced mode of construction are thus achieved. Moreover, these embodiments create the possibility of additionally fixing and centering the bottle head as well as of providing protection against wear-increasing contact between the bottle head and the collet chuck.

The rigid bridge in the interior of the collet chuck can, moreover, serve as an abutment for a pressure spring moving the collet chuck into the opening position. A compact, closed construction is thus possible and the collet chuck itself need not create any restoring forces.

The collet chuck can be constructed as an individual structural component, which is equipped with a baselike connecting section and which is separated from the pistonlike actuating element, but releasably connected thereto.

It is, however, also possible to provide a particularly advantageous integral structural design of the collet chuck, of the pistonlike actuating element and of the sealing element of said pistonlike element due to the fact that the collet chuck can be produced from flexible plastic material with good sliding properties in the case of a gripping bell according to the present invention. The one-piece structural unit defined by the collet chuck, the piston and the sealing means permits extremely advantageous production costs and, if necessary, a simple and rapid exchange of the collet chuck. Due to the one-piece structural design, it is automatically guaranteed that the two parts which may be subjected to wear, i.e. the collet chuck and the sealing lip, are always renewed together.

Figure 2:
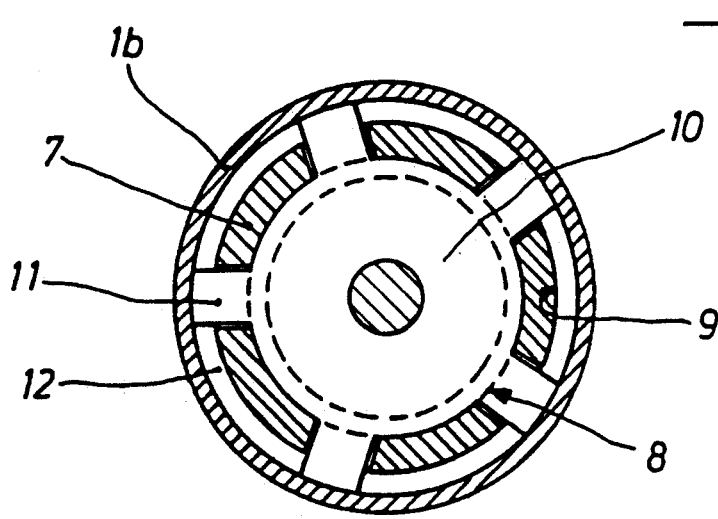
Figure 3:
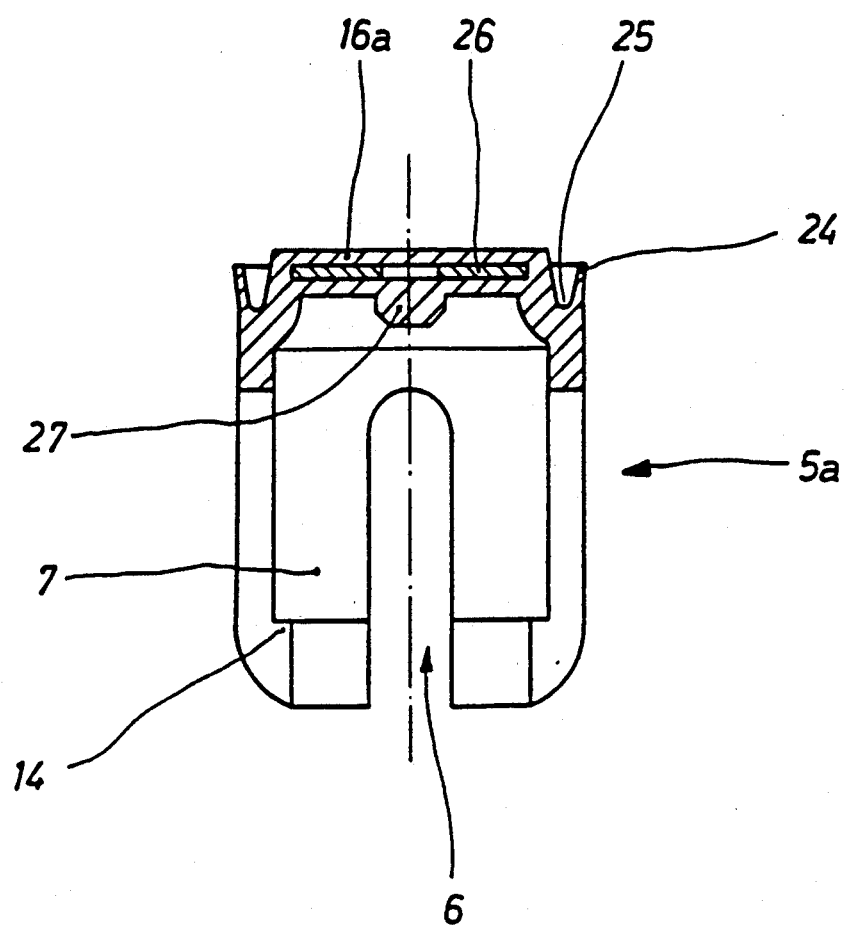

In the following, an embodiment of the present invention will be described on the basis of the drawings, in which:

FIG. 1 is a vertical sectional view of a gripping bell, the closed position being shown on the left-hand side and the open position being shown on the right-hand side, FIG. 2 is a horizontal sectional view taken along the line A-B in FIG. 1, FIG. 3 is a vertical sectional view of a different embodiment of a collet chuck.

The gripping bell according to FIGS. 1 and 2 comprises a rotationally symmetrical, sleevelike housing 1 consisting of hard plastic material with good sliding properties. The end of the housing 1 which constitutes the upper end in the vertical position of use shown is closed by a cover formed on said housing. A central connection pin 17 through which a hole extends is formed in the interior of said cover, said connection pin 17 having secured thereto a flexible hose 18 or a tube. On the one hand, this hose or tube serves to hold the gripping bell in the gripping head of a bottle packing or unpacking machine which is not shown in detail, and, on the other hand, it serves to supply compressed air to a cylindrical space 19 formed at the upper end of the housing 1. A sealed, pistonlike actuating element 4 is arranged in said cylindrical space 19 such that it is axially movable.

At the end of the gripping bell which constitutes the lower end in the vertical position of use shown, a circular reception opening 2 is provided whose diameter is slightly larger than the diameter of the head of a bottle to be gripped (indicated by a dot-and-dash line). The reception opening 2 is followed at the lower end thereof by a conically widening centering surface 20 for the head of the bottle. At the upper end thereof, the reception opening 2 is followed by a control surface 3, which, too, widens approximately conically and which is rounded in the fashion of a flute. The lower end tangent of the control surface 3 extends at an acute angle to the horizontal. The upper end tangent of the control surface 3 extends vertically and merges seamlessly with the cylindrical inner surface 9 of the housing 1. The reception opening 2, the centering surface 20, the control surface 3 and the inner surface 9 are arranged concentrically with the central axis of the housing 1.

The interior of the housing 1 has arranged therein a sleeve-like collet chuck 5, which consists of flexible plastic material and which extends from the actuating element 4 essentially down to the reception opening 2, said collet chuck being arranged such that it is axially displaceable. Said collet chuck 5 has, at the upper end thereof, a horizontal base 16, which is formed integrally therewith and through which it rests on the pistonlike actuating element 4 in large area contact therewith. The collet chuck 5 is releasably connected to the actuating element 4 by means of a central screw 30 extending through said base 16.

The outer circumferential surface of the collet chuck 5 is cylindrical almost throughout its whole length and it is displaceably guided on the inner surface 9 of the housing 1. Only in its lower end section, is said outer circumferential surface of the collet chuck 5 rounded in a convex shape corresponding to the control surface 3 and—when the collet chuck is open—said outer circumferential surface ends at the reception opening 2. The inner circumferential surface of the collet chuck 5 is also cylindrical to a large extent and has in its lower end section a stepped thickened portion 14, which—when the collet chuck is open—extends partially cylindrical on the inside and is in alignment with the reception opening 2. The collet chuck 5 has a plurality of axially extending slots 6, which are uniformly distributed around its circumference and which are open at the lower end thereof, whereby a plurality of individual gripping fingers 7 is formed. The slots 6 end at a certain distance from the base 16 of said collet chuck 5 so that the upper area thereof is continuously cylindrical.

In the interior of the collet chuck 5, a disklike bridge 10 is arranged approximately in the central area in a horizontal position. The circumference of said disklike bridge 10 is provided with a plurality of radially extending webs 11, which extend with a certain amount of play through the slots 6 and which are in close fitting engagement with an annular recess 12 formed on the inner side of the housing 1. In this way, the bridge 10 is rigidly fixed in the housing 1 and it does not take part in the axial movement of the collet chuck 5.

At the level of the recess 12, the housing 1 is divided in a horizontal plane in such a way that the upper boundary of the recess 12 is located in the upper housing section 1a and the lower boundary in the lower housing section 1b. Both housing sections are releasably screwed together by means of a thread 21. It follows that, when the lower housing section 1b has been screwed off, the bridge 10, the collet chuck 5 and the actuating element 4 can be removed from the upper housing section 1a either individually or in common. During assembly of the gripping bell, it is, on the other hand, possible to introduce the actuating element 4 and the collet chuck 5 into the upper housing section 1a, when the lower housing section 1b has been screwed off. Following this, the bridge 10 is placed onto the lower edge of the upper housing section 1a, and, in this position, it is finally fixed by screwing on the lower housing section 1b. The bridge 10 will then captively hold together all components so as to form a structural unit.

The lower surface of the bridge 10, which faces the reception opening 2, has provided thereon an annular, cylindrical extension 13 formed concentrically with said reception opening 2. The diameter of the cylindrical inner side of said extension 13 corresponds to the diameter of the reception opening 2 and defines a reception chamber for the head of a bottle to be gripped. The horizontal lower surface of the bridge 10 acts as a stop means for the upper side of the bottle head and guarantees that the desired relative position between the bottle and the gripping bell is exactly observed. The cylindrical outer surface of the extension 13 is constructed as a guide surface 8 for the collet chuck 5 and its gripping fingers 7. Said outer surface defines together with the cylindrical inner surface 9 of the housing 1 an annular guide passage encompassing the collet chuck 5 in close relationship therewith, but with a sufficient amount of play for movement. In the area of this guide passage, the collet chuck 5 can only be subjected to tensile stress or to shear stress, whereas a bending or buckling stress is prevented. The lower end of the guide surface 8 extends up to the location where the inner surface 9 smoothly merges with the control surface 3. Hence, the lower end sections of the gripping fingers 7 can deform under the influence of the control surface 3 without hindrance.

A pressure spring 15 rests on the upper side of the bridge 10, the upper end of said pressure spring acting on the base 16 of the collet chuck 5 and on the actuating element 4, respectively, to urge said actuating element 4 upwards. The uppermost end position is determined by a stop surface which is formed on the actuating element 4 and which comes into contact with the lower surface of the upper lid of the housing 1. In this position, which is shown in FIG. 1 on the right-hand side, the collet chuck 5 is open and its gripping fingers 7 are retracted. In this condition, the inner cylindrical surface of the extension 13 and the inner cylindrical surface of the thickened portions 14 are in alignment with the reception opening 2. The head of a bottle to be gripped can thus penetrate into the gripping bell without hindrance, the functionally important elements, especially the gripping surface defined by a bevelled end 22 on the tips of the thickened portions 14 of the gripping fingers 7, being well protected against damage, which may be caused e.g. by the bottle cap. In its open position, the collet chuck 5 follows with its entire outer surface the inner surface 9 of the housing 1 as well as the rounded control surface 3 and is not subjectd to any stress.

When compressed air is supplied under sufficient pressure to the cylindrical space 19 through the hose 18, the actuating element 4 together with the collet chuck 5 will move downwards in the direction of the reception opening 2 against the force applied by the pressure spring 15. If no bottle is present, the movement will be stopped by a cam 23 formed on the upper surface of the bridge 10; the head of the screw 30 interconnecting the collet chuck 5 and the actuating element 4 coming into contact with said cam. It follows that the cam 23 determines the maximum closing movement of the collet chuck 5 and, consequently, the smallest mutual distance between the bevelled ends 22 of the gripping fingers 7 in the closing position. This closing position is defined such that no disadvantageous loads will occur in the gripping fingers. Upon moving into the closing position under the influence of the actuating element 4, the gripping finger ends, which now project beyond the inner guide surface 8, are deformed on the control surface 3 in such a way that they will carry out a sliding movement which is directed essentially radially towards the central axis of the gripping bell. In the course of this movement, the adequately rounded outer end sections of the gripping fingers 7 slide along the control surface 3. The deformation is thus limited to the lower end sections of the gripping fingers 7. The gripping movement will be continued until the bevelled ends 22 of the gripping fingers come into contact with the bottle and clamp the bottle firmly between them. Due to the fact that the gripping movement of the gripping fingers is carried out predominantly in the radial direction, almost all conventional bottles and vessels, even those having a strongly thickened head portion, can be gripped easily and reliably.

Just as the collet chuck 5 according to FIG. 1 and 2, the collet chuck 5a according to FIG. 3 consists of flexible plastic material, such as molded polyurethane, and is intended to be installed in the housing 1 shown in FIG. 1 and 2. It is also formed integrally with a base 16a, which is, however, constructed as a one-piece piston for the cylindrical space 19 in this case. A circular metal disk 26 is fully embedded in the base 16a of the collet chuck for the purpose of reinforcement. A circular, projecting centering shoulder 27 is formed on the lower surface of the base 16a facing the the gripping fingers 7, said centering shoulder 27 centering the pressure spring 15 after installation in the housing 1. Hence, said pressure spring 15 rests directly on the base 16a or rather on the piston. Moreover, the centering shoulder 27 cooperates with the cam 23 formed on the upper surface of the birdge 10 and determines thus the lowermost end position of the collet chuck 5a.

The collet chuck 5a according to FIG. 3 is provided with four axially extending, edge-open slots 6, which are uniformly distributed around the circumference thereof. Hence, it requires a bridge 10 whose circumference is, correspondingly, provided with four radial webs 11.

A rotationally symmetrical sealing lip 24 is formed integrally with the collet chuck 5a and the base 16a, respectively, at the upper edge of said collet chuck 5a and at the lateral edge of the base 16a, respectively. FIG. 3 shows that, when the collet chuck 5a is not installed, the sealing lip 24, in its unstressed condition, projects outwards at a slightly oblique angle relative to the cylindrical outer surface of said collet chuck so that, after having been installed in the housing 1, it will abut on the cylindrical inner wall 9 of the housing with the desired pressure. The sealing lip 24 is followed, towards the centre thereof, by an annular groove 25 which is open at the top in the axial direction. On the one hand, this annular groove provides the desired elasticity of the sealing lip 24, and, on the other hand, it permits the pressure medium, which is introduced in the cylindrical space 19, to act on said sealing lip 24 from inside and to press it more strongly against the surface 9.

The end face of the base 16a, which is flat with the exception of the annular groove 25 and which faces away from the gripping fingers 7, cooperates with the lid, which is formed on the upper end of the housing 1, in the manner of a stop means and determines thus the upper position or open position of the collet chuck 5a. In order to prevent the sealing lip 24 from contacting the lid in this position, the upper, free end of said sealing lip ends a short distance from the plane of said end face of the base 16a.

The above-mentioned collet chuck 5a fulfills all functions, which, in the case of the collet chuck 5 according to FIG. 1 and 2, are carried out by the collet chuck itself, the piston 4 and the sealing ring of said piston.

I claim:

1. A gripping bell for bottles comprising a sleeve-like housing having a central axis and a reception opening for the head of a bottle in a lower end thereof, said housing having an inner surface comprising a control surface portion that widens conically upwardly and outwardly from said reception opening and an axis parallel surface portion located above and that merges with an upper end of said control surface portion, an actuating element arranged for axial movement in an upper portion of the interior of said housing, a sleeve-like collet chuck slidably mounted for axial movement in said housing between said actuating element and said reception opening, said collet chuck comprising a base portion attached to said actuating element and a plurality of elastic, circumferentially spaced gripping fingers extending downwardly from said base and separated from each other by axis parallel slots, each of said fingers having inner and outer side surfaces and gripping ends at the lower ends thereof, the outer side surfaces of said fingers being slidably guided by said axis parallel surface portion of said inner surface of the housing while said ends are slidably guided by said control surface portion thereof, and a stationary guide surface in the interior of said housing spaced radially inwardly from and extending parallel to at least a portion of said axis parallel surface portion of said inner surface of said housing to form an annular guide passage with said inner surface for said fingers, whereby during axial movement of said collet chuck within said housing by said actuating element, said ends of said elastic fingers are deformed and directed radially inwardly into a gripping position or radially outwardly into a bottle receiving position by said control surface portion of the housing's inner surface depending on the direction of movement of said collet, while said inner and outer side surfaces of said fingers are slidably guided in said annular guide passage, respectively, by said stationary guide surface and the axis parallel surface portion of said inner surface.

2. The gripping bell of claim 1, wherein the stationary guide surface is circumferentially symmetrical and is concentrically located with respect to the collet chuck and the axis parallel surface portion of said inner surface.

3. The gripping bell of claim 2, wherein the stationary guide surface is cylindrical.

4. The gripping bell of claim 3, wherein the axis-parallel portion of said inner surface is cylindrical.

5. The gripping bell of claim 4, wherein said collet chuck is cylindrical and said inner and outer side surfaces of the gripping fingers of the collet are cylindrical.

6. The gripping bell of claim 5, wherein the stationary guide surface extends downwardly to approximately opposite the merge between said control surface portion and said cylindrical surface portion of the inner surface of the housing.

7. The gripping bell of claim 1, wherein the control surface portion of the inner surface is rounded in a concave shape and the tip ends of the gripping fingers are rounded in a complementary convex shape.

8. The gripping bell of claim 1, wherein the stationary guide surface extends downwardly from a fixed bridge that extends across the axis of the housing between the actuating element and the reception opening.

9. The gripping bell of claim 8, wherein said bridge has a plurality of radially oriented webs that extend through the axis parallel slots between said fingers of the collet chuck and rest in a circumferential recess in the inner surface of the housing.

10. The gripping bell of claim 9, wherein adjacent said recess, the housing is divided into 2 parts in a plane extending perpendicularly to the central axis, and means for releasably interconnecting said 2 parts of the housing together.

11. The gripping bell of claim 8, wherein on a side of the bridge facing the reception opening, the bridge has a downwardly extending annular wall whose interior surface forms with the bridge a reception chamber for a bottle head and whose exterior surface forms said stationary guide surface.

12. The gripping bell of claim 11, wherein the diameter of the reception chamber corresponds approximately to the diameter of said reception opening and is concentric therewith.

13. The gripping bell of claim 11, wherein the tip ends of the gripping fingers have a stepped, thickened portion on their inner sides and, when the ends are in a bottle receiving position, said thickened portions define a cylindrical surface that is in alignment with the interior surface of the annular wall of the reception chamber.

14. The gripping bell of claim 8, wherein the gripping bell is pneumatically operated and said actuating element comprises a piston slidingly and sealingly mounted for axial movement within said housing to form therewith a piston-cylinder unit.

15. The gripping bell of claim 14, including spring means acting between a side of the bridge facing away from the reception opening and the piston to bias the piston and attached collet chuck upwards and the ends of the fingers into a bottle receiving position.

16. The gripping bell of claim 15, wherein the fingers and the base portion of the collet chuck are integrally formed as one piece.

17. The gripping bell of claim 16, wherein the piston comprises a separate member and the base portion of the collet chuck is releasably attached to said member.

18. The gripping bell of claim 16, wherein the base portion of the collet chuck is disc shaped and extends across the axis of the housing and forms said piston, said base portion having a circumferentially extending elastic sealing lip abutting the inner surface of the housing.

19. The gripping bell of claim 18, wherein the circumferential end of said sealing lip faces towards an end of the collet chuck facing away from the gripping fingers.

20. The gripping bell of claim 19, wherein an annular groove is provided in the base portion radially inward from the sealing lip that opens in the same direction as the lip faces.

21. The gripping bell of claim 20, wherein the sealing lip end extends up to a level slightly below the plane of a side of the base portion facing away from the gripping fingers.

22. The gripping bell of claim 18 including a metallic reinforcement plate embedded in the base portion.

23. The gripping bell of claim 18 including a centering shoulder formed on the side of the base portion facing the gripping fingers for securing the spring means.

24. The gripping bell of claim 1, wherein the collet chuck is made from a flexible plastic material.

* * * * *